(No Model.)
I. CHURCH.
EXPANSION BOLT.
No. 570,786. Patented Nov. 3, 1896.
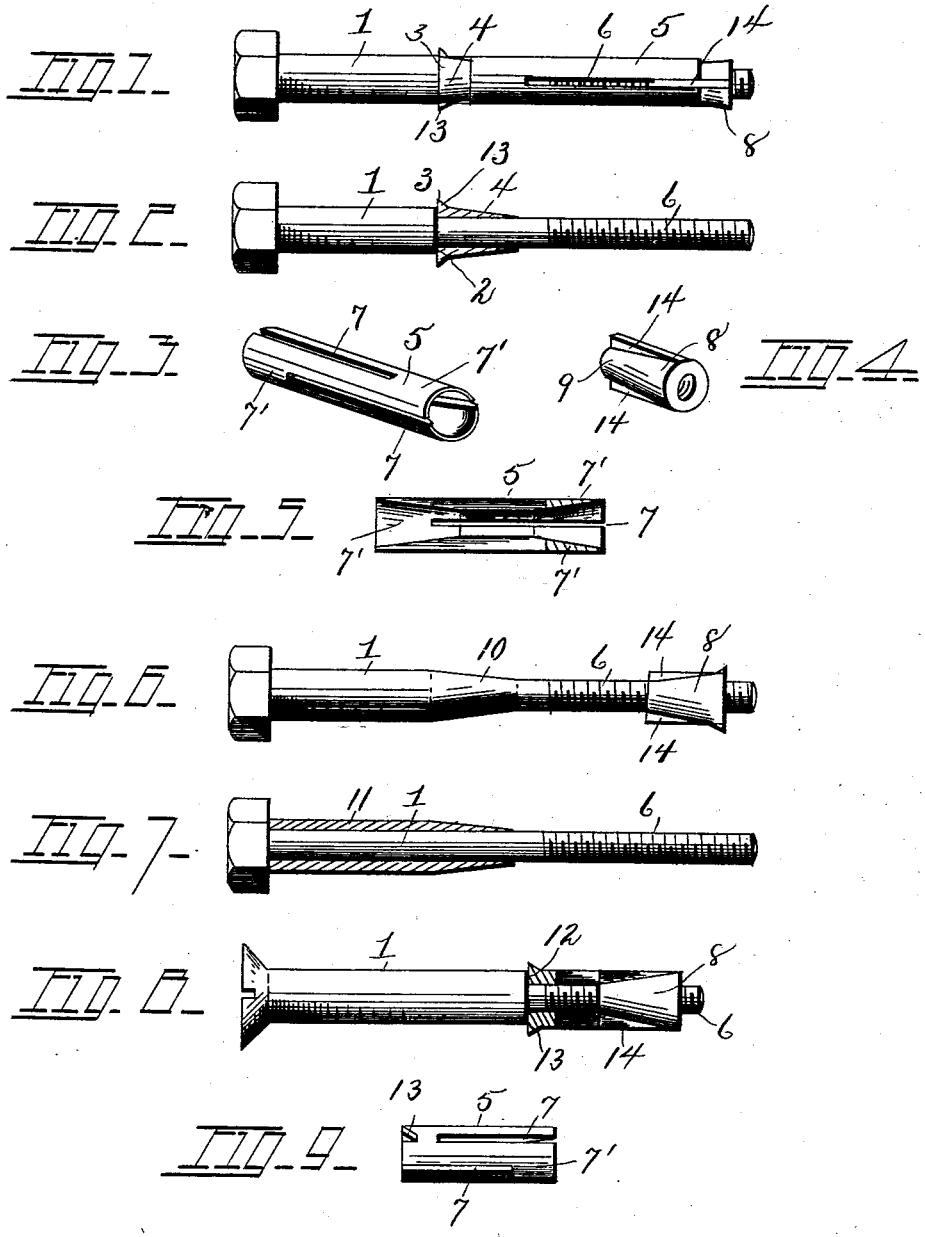
WITNESSES
Carl H. Keller.
Carroll J. Webster
INVENTOR
Isaac Church
By William Webster Atty.

UNITED STATES PATENT OFFICE.

ISAAC CHURCH, OF TOLEDO, OHIO.

EXPANSION-BOLT.

SPECIFICATION forming part of Letters Patent No. 570,786, dated November 3, 1896.

Application filed March 16, 1896. Serial No. 583,328. (No model.)

*To all whom it may concern:*

Be it known that I, ISAAC CHURCH, of Toledo, county of Lucas, and State of Ohio, have invented certain new and useful Improvements in Expansion-Bolts; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an expansion-bolt, and has especial reference to an expansion-sleeve and means for expanding the same.

In the drawings, Figure 1 is an elevation of a preferred form of expansion-bolt constructed in accordance with my invention. Fig. 2 is a like view with the expansion-sleeve removed and one of the conical expanders shown in cross-section. Fig. 3 is an elevation of the expansible sleeve. Fig. 4 is a like view of an expanding-nut. Fig. 5 is a longitudinal section of the expansible sleeve. Fig. 6 is an elevation of a modified form of bolt with the sleeve removed. Fig. 7 is an elevation of a further modification in accordance with my invention with a tapered covering arranged thereon and shown in section. Fig. 8 is an elevation of a further modification, and Fig. 9 is an elevation of an expansible sleeve employed in the construction shown in Fig. 8.

Referring to Figs. 1 to 5, inclusive, the bolt 1 is formed with a square shoulder 2 at a point along its length, against which the enlarged end 3 of a conical expander 4 abuts, and an expansible sleeve 5 is placed upon the projecting screw-threaded end 6, with the inner end encircling the expander 4. Sleeve 5 is formed with a plurality of slits 7, extending from each end in inverse order toward each opposite end, considerably past the center from either direction, thereby forming a web 7' to hold each semicircular portion assembled without the use of rubber bands, wire, or other encircling fastenings, as has been necessary heretofore with separable sleeves, allowing both ends of the sleeve to expand, and a conical nut 8 is run upon the screw-threaded end of the bolt, with the tapered end 9 entering the end of the sleeve, whereby when the bolt is screwed into the nut the tendency is to force the expander 4 into the inner end of the sleeve, with a true diameter along its length.

In Fig. 6 the bolt is formed with an integral conical portion 10, which subserves the purpose of the expander 4, and the nut 8 is employed upon the outer end.

In Fig. 7 the body of the bolt is of a diameter equal to that of the screw-threaded end, and the expander 4 is elongated from the conical end to form a body 11 to abut against the head of the bolt.

In Fig. 8 the conical portion 4 is omitted and the bolt is formed with a square shoulder 12, against which the end of the sleeve abuts, with the nut 8 entering the outer end of the sleeve to expand the same.

Fig. 9 shows the sleeve 5, employed in the construction shown in Fig. 8, of like formation to that of the sleeve heretofore described, but shorter.

In the constructions shown in Figs. 1, 2, 8, and 9 I prefer to form slight radial projections 13 to embed into the wall of the orifice in which the sleeve is to be expanded to prevent revolution of the expander or sleeve, and I prefer to form nut 8 with wings 14 to enter the slits of the sleeve for a like purpose.

In the employment of the bolt constructed as described the wall of the orifice into which the bolt is to be secured is formed of a diameter to allow of insertion of the sleeve when the bolt is revolved, thereby drawing the expanders into the sleeve, with the effect of expanding the sleeve into such close frictional engagement with the wall of the orifice that the bolt becomes a fixture.

In the modification shown in Figs. 8 and 9 the portion of the expansion of the sleeve is essentially the same as that effected in the construction shown in the previous figures, as by reason of the extension of the slits 7 considerably past the center of the length of the sleeve the insertion of the expanding-nut 8 to the center of the length of the sleeve or approximately to the center will effect a true radial expansion of the sleeve along its entire length.

What I claim is—

1. In an expansion-bolt, a bolt provided with a threaded end, a sleeve encircling the same formed with oppositely-arranged slits extending past the longitudinal center of the sleeve and means for expanding both ends of the sleeve radially.

2. In an expansion-bolt, an expansible sleeve having a plurality of slits extending from each end in opposite directions beyond the longitudinal center of the sleeve, a bolt of a diameter to enter the sleeve and provided with oppositely-disposed conical portions to enter the sleeve with means on the bolt to cause the conical expanders to approach.

3. In an expansion-bolt, a bolt provided with a conical expansion-body extending from the head toward the threaded end, a conical winged nut on the bolt and an oppositely-slitted expanding sleeve arranged between the two conical portions with the wings of the nut entering the slits of the sleeve and means for drawing the conical expander portions into the sleeve.

4. In an expansion-bolt, a bolt formed with a shoulder, and a threaded portion extending therefrom of less diameter, an expander upon the bolt abutting against the shoulder and provided with radial projections, an expanding sleeve upon the threaded end of the bolt having oppositely-disposed slits and a conical nut run upon the threaded end of the bolt entering the outer end of the sleeve.

In testimony that I claim the foregoing as my own I hereby affix my signature in presence of two witnesses.

ISAAC CHURCH.

Witnesses:
CARROLL J. WEBSTER,
MAUD SCHUMACHER.